(12) United States Patent
Hughes

(10) Patent No.: US 7,159,479 B1
(45) Date of Patent: Jan. 9, 2007

(54) ACTIVE DAMPER FOR STABILIZED MIRRORS

(75) Inventor: John G. Hughes, Casselberry, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/670,609

(22) Filed: Sep. 25, 2003

(51) Int. Cl.
*G01C 19/30* (2006.01)
*G01C 19/04* (2006.01)
*G05B 5/01* (2006.01)
*G02B 27/46* (2006.01)

(52) U.S. Cl. .......................... 74/5.47; 74/5.5; 318/618; 359/564

(58) Field of Classification Search ................ 74/5.4, 74/5.47, 5.5, 5.6 D; 318/621, 632, 568.22, 318/611, 623, 629, 463
See application file for complete search history.

(56) References Cited

U.S. PATENT DOCUMENTS

| | | | | |
|---|---|---|---|---|
| 3,050,670 A | * | 8/1962 | Anger et al. .................. 318/72 |
| 3,836,833 A | * | 9/1974 | Harris et al. ................. 318/270 |
| 4,143,311 A | * | 3/1979 | Lee ............................. 318/611 |
| 4,230,294 A | * | 10/1980 | Pistiner ....................... 244/170 |
| 4,536,689 A | * | 8/1985 | Davidson .................... 318/565 |
| 4,881,800 A | * | 11/1989 | Fuchs et al. ................. 74/5.22 |
| 5,203,220 A | * | 4/1993 | Lerman ....................... 74/5.22 |
| 5,307,206 A | * | 4/1994 | Haessig, Jr. ................. 318/611 |
| 5,643,142 A | * | 7/1997 | Salerno et al. ................ 482/54 |
| 5,714,831 A | * | 2/1998 | Walker et al. ......... 310/316.01 |
| 5,793,541 A | * | 8/1998 | Cattan et al. ................ 359/843 |
| 6,100,535 A | * | 8/2000 | Mathies et al. ........... 250/458.1 |
| 6,107,770 A | * | 8/2000 | Jackson et al. ............. 318/611 |
| 6,137,254 A | | 10/2000 | Hughes |
| 6,472,840 B1 | * | 10/2002 | Takahashi ................... 318/611 |
| 6,483,610 B1 | * | 11/2002 | Burns ......................... 358/474 |
| 6,597,146 B1 | * | 7/2003 | Rehm et al. ................. 318/632 |
| 6,686,716 B1 | * | 2/2004 | Predina et al. .............. 318/610 |
| 2003/0024333 A1 | * | 2/2003 | Wyse ............................ 74/5.4 |

\* cited by examiner

*Primary Examiner*—Roger Pang
(74) *Attorney, Agent, or Firm*—Jeffrey D. Myers; Timothy D. Stanley; Peacock Myers, P.C.

(57) ABSTRACT

An active damping method for a stabilized mirror, and a corresponding active damper apparatus, comprising providing a tachometer measuring speed of a motor driving the mirror, employing compensation electronics receiving input from said tachometer and the motor, and employing drive electronics providing output to the motor.

22 Claims, 7 Drawing Sheets

ACTIVE DAMPER FOR STABILIZED MIRRORS

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to dampening of belt modes of stabilized mirrors.

2. Description of Related Art

Gimbal assemblies are commonly employed in optical systems, such as forward looking infrared (FLIR) and laser based targeting and imaging systems, to position and/or stabilize optics, including mirrors. Precise pointing and stabilization of the optical line of sight is important to ensure line of sight accuracy, modulation transfer function, and so forth. Known gimbal assemblies include mirrors and/or lens assemblies that are controlled by belt drive systems, wherein a belt couples a belt drive motor situated on a gyro platform with a rotatable mirror of the gimbal assembly.

Gimbal assemblies having belt drive systems are often used in applications where they are subjected to significant vibra-acoustic energy. Vibra-acoustic energy can disturb and/or degrade stabilization performance. In a gimbal assembly having a belt driven mirror, belt mode resonance causes amplification of mirror vibration that results in degradation of system performance. For example, mirror vibration can reduce the line of sight accuracy in a forward looking infrared radar/laser based optical system, further resulting in the degradation of targeting and/or imaging accuracy.

The vibra-acoustic energy causes the belt drive and mirror to vibrate at a frequency known as the belt modal frequency. For example, a belt modal frequency at around 400 hertz results in an approximate 52 decibel gain, which results in a substantial line of sight (LOS) disturbance of approximately 170 micro-radians root mean squared (RMS).

Most known systems use passive dampers to counter vibrations due to vibra-acoustic energy disturbance (e.g., vibra-acoustic disturbance torque). An exemplary passive damper can comprise a piece of tungsten steel mounted with rubber in shear, wherein the rubber has a high internal damping coefficient. Such passive dampers are also known in the art as inertial dampers or constrained layer dampers. However, passive dampers have several limitations. For example, passive dampers are limited in their ability to counter the effects of vibra-acoustic disturbance energy. Passive dampers typically provide only a 14 decibel improvement over undamped systems. Although passive dampers do provide some improvement, an undesirable amount of line of sight disturbance can still remain. In addition, passive dampers do not function efficiently, or at all, in cold environments. Notch filters may be employed to provide control loop stability but do nothing to attenuate LOS disturbance due to vibra-acoustics.

U.S. Pat. No. 6,137,254, entitled "Active Vibra-Acoustic Damper", to Hughes, discloses one form of active damping, but lacks significant advantages of the present invention.

BRIEF SUMMARY OF THE INVENTION

The present invention is of an active damping method for a stabilized mirror, and a corresponding active damper apparatus, comprising: providing a tachometer measuring speed of a motor driving the mirror; employing compensation electronics receiving input from said tachometer and the motor; and employing drive electronics providing output to the motor. In the preferred embodiment, the motor comprises a DC torque motor (e.g., a limited angle tachometer), the tachometer comprises a limited angle tachometer, the electronics comprise an AC coupled rate loop (preferably wherein the electronics provide nearly zero phase shift at the lower and upper crossover frequencies of the damper control loop), and the method/apparatus operates on a stabilized mirror in a gimbal. Preferably, the method/apparatus dampens a belt mode, more preferably a belt modes at a frequency between approximately 240 Hz to 700 Hz, most preferably at or about 400 Hz, and most preferably provides at least approximately 70% dampening of a drive belt mode and wherein the method/apparatus is substantially insensitive to belt frequency. The method/apparatus is substantially insensitive to changes in temperature and does not affect operation of the mirror at frequencies at or below approximately one-half of a belt mode frequency.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 5:
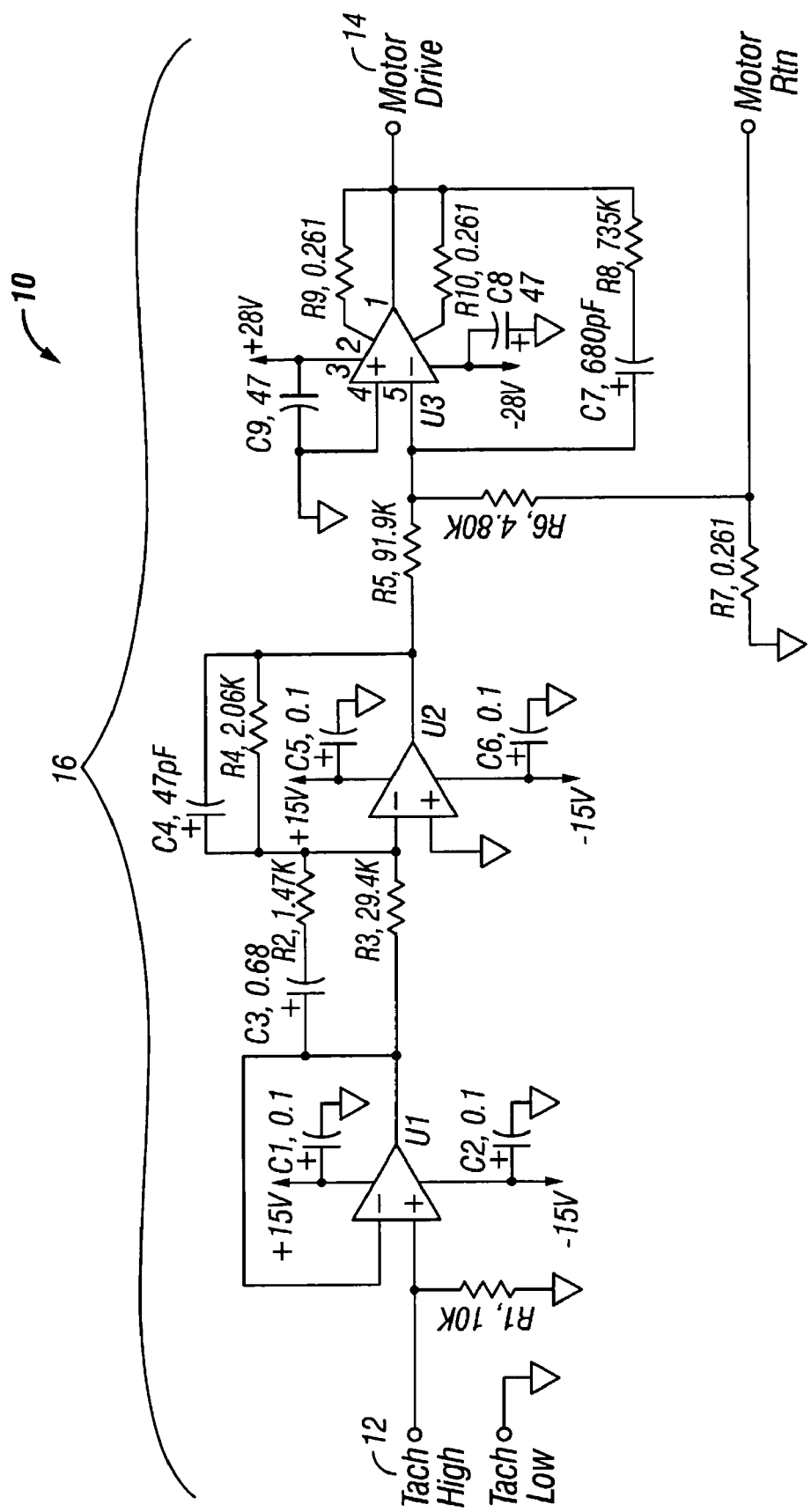
FIG. 5 is a circuit diagram of the preferred compensation and drive electronics of the invention in conjunction with a DC torque motor and limited angle tachometer, particularly useful for damping an approximate 400 Hz belt mode.

Referring to FIG. 5, the present invention is of an active damper 10 for stabilized mirrors (and a corresponding method), comprising a tachometer 12 measuring speed of the belt drive motor 14 and compensation and drive electronics 16. The invention stabilizes the line of sight of a belt driven mirror (e.g., in a gimbal assembly) when vibra-acoustic noise excites the belt mode resonance. Gimbal assemblies, for example, steer the line of sight of the mirror using a housing motor situated on a gyro platform, and an associated belt drive. As such, the active damper is configured to be insensitive to lower frequencies, thereby allowing the gimbal assembly to move the mirror at a relatively slow constant rate. The active damper prevents the higher natural frequencies from exciting the mirror and destabilizing the line of sight. The invention is insensitive to variations in the dampened belt mode that are induced thermally or via variations in manufacturing.

Figure 1A:
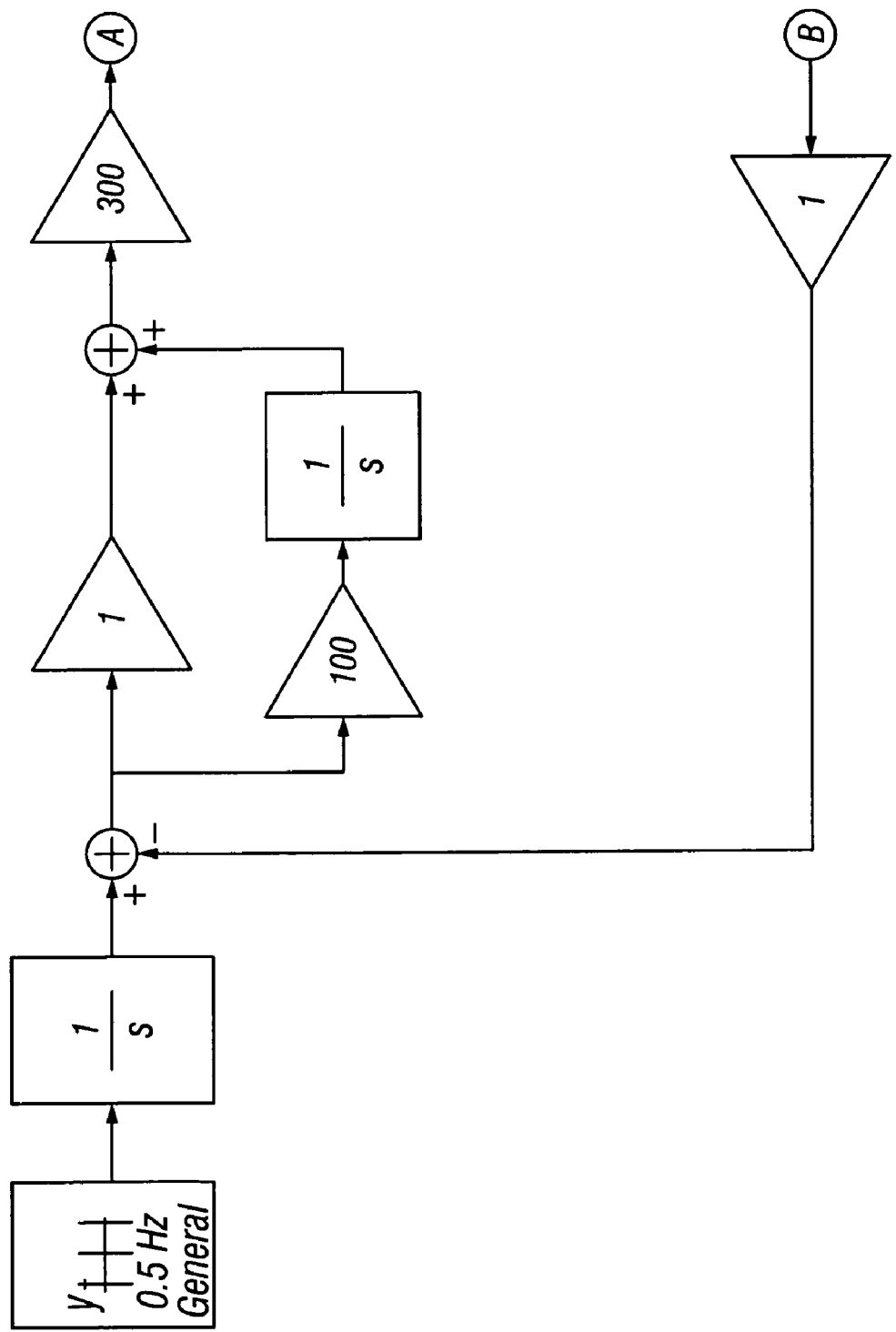
FIGS. 1A and 1B present a functional block diagram of the gimbal servo with a 2:1 mirror drive in which the invention is incorporated.
Figure 1B:
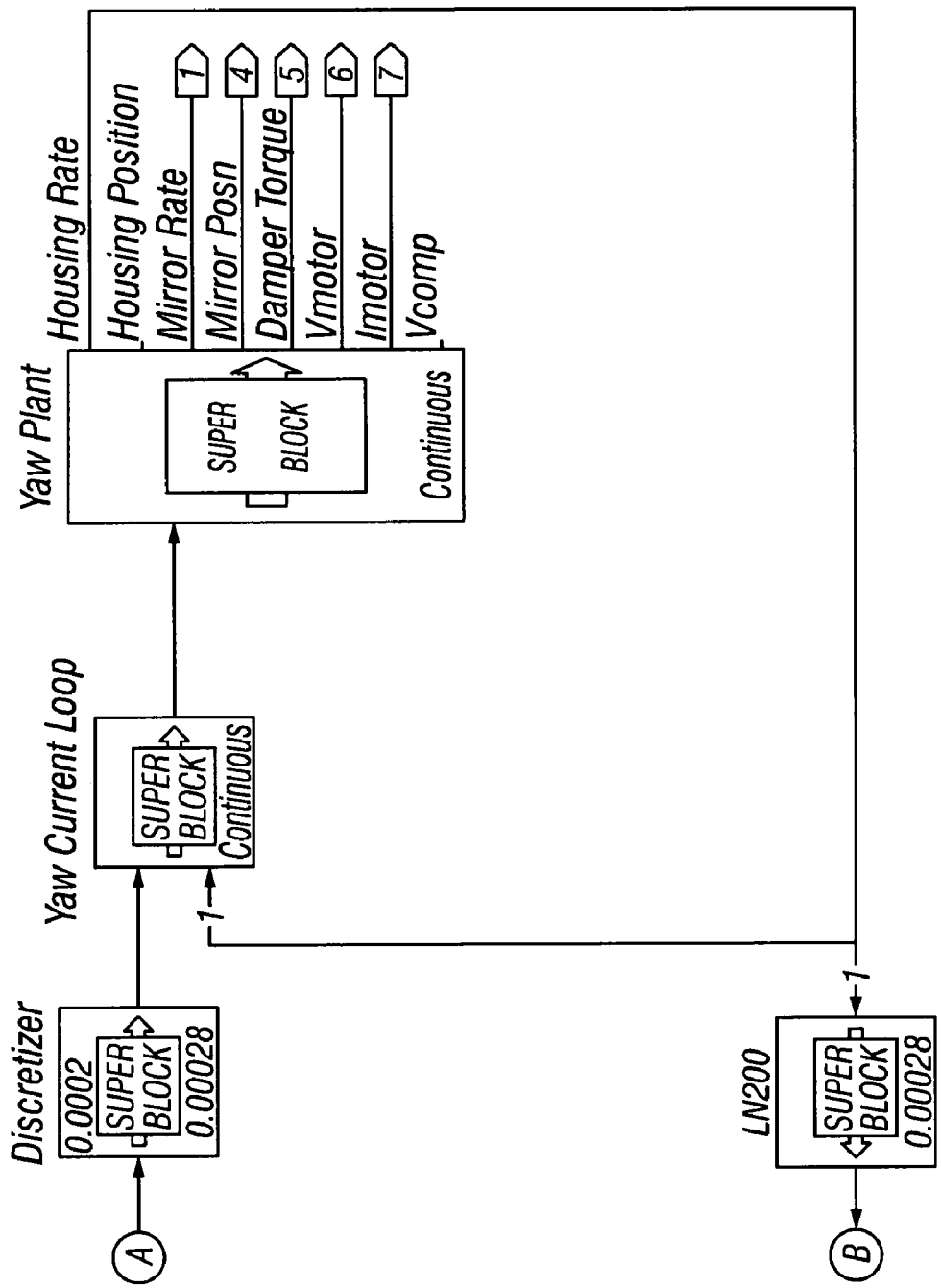
Figure 2A:
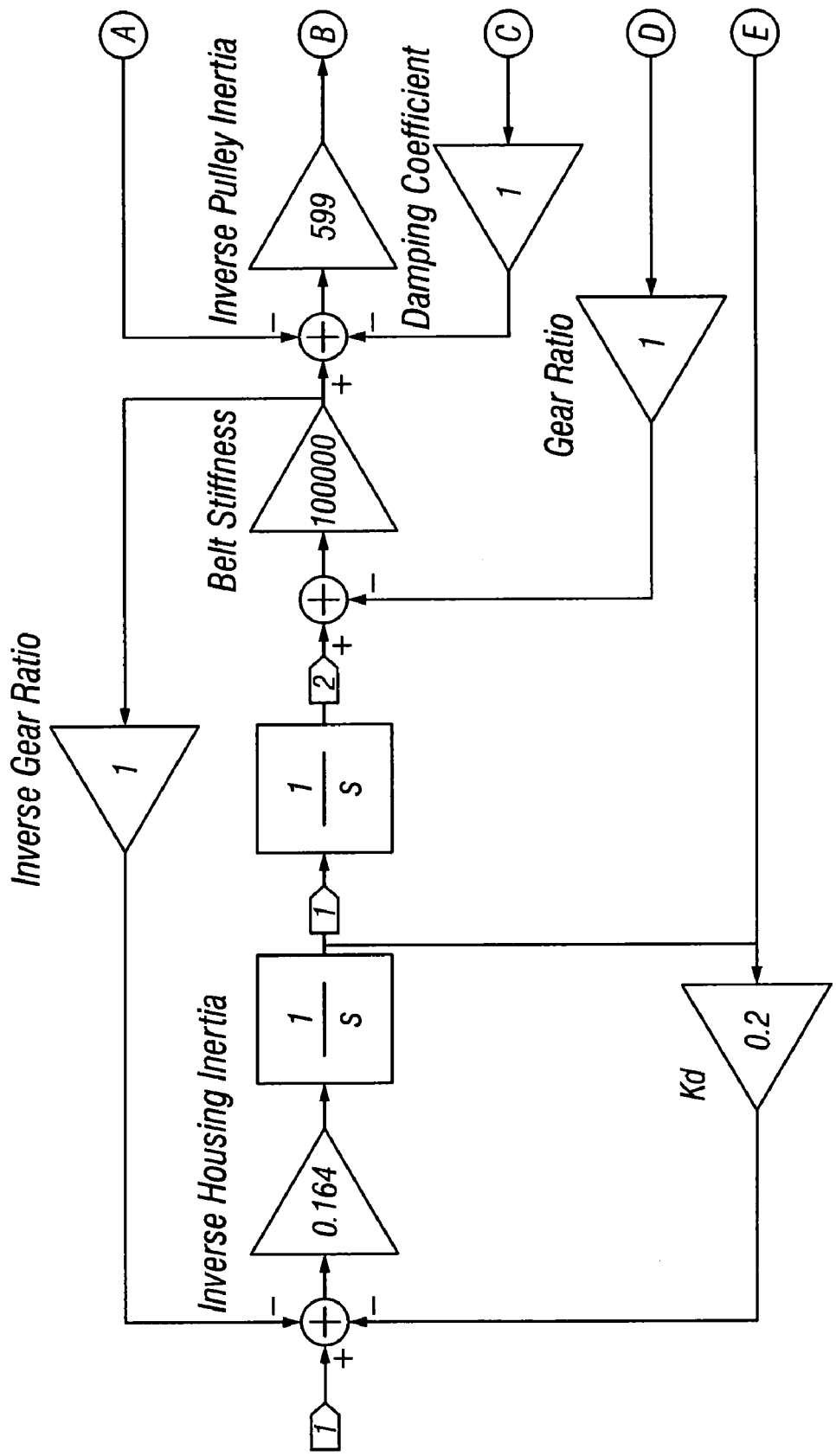
FIGS. 2A and 2B present a functional block diagram of the mechanism mass properties including the yoke assembly and the 2:1 mirror belt drive assembly of FIG. 2.
Figure 2B:
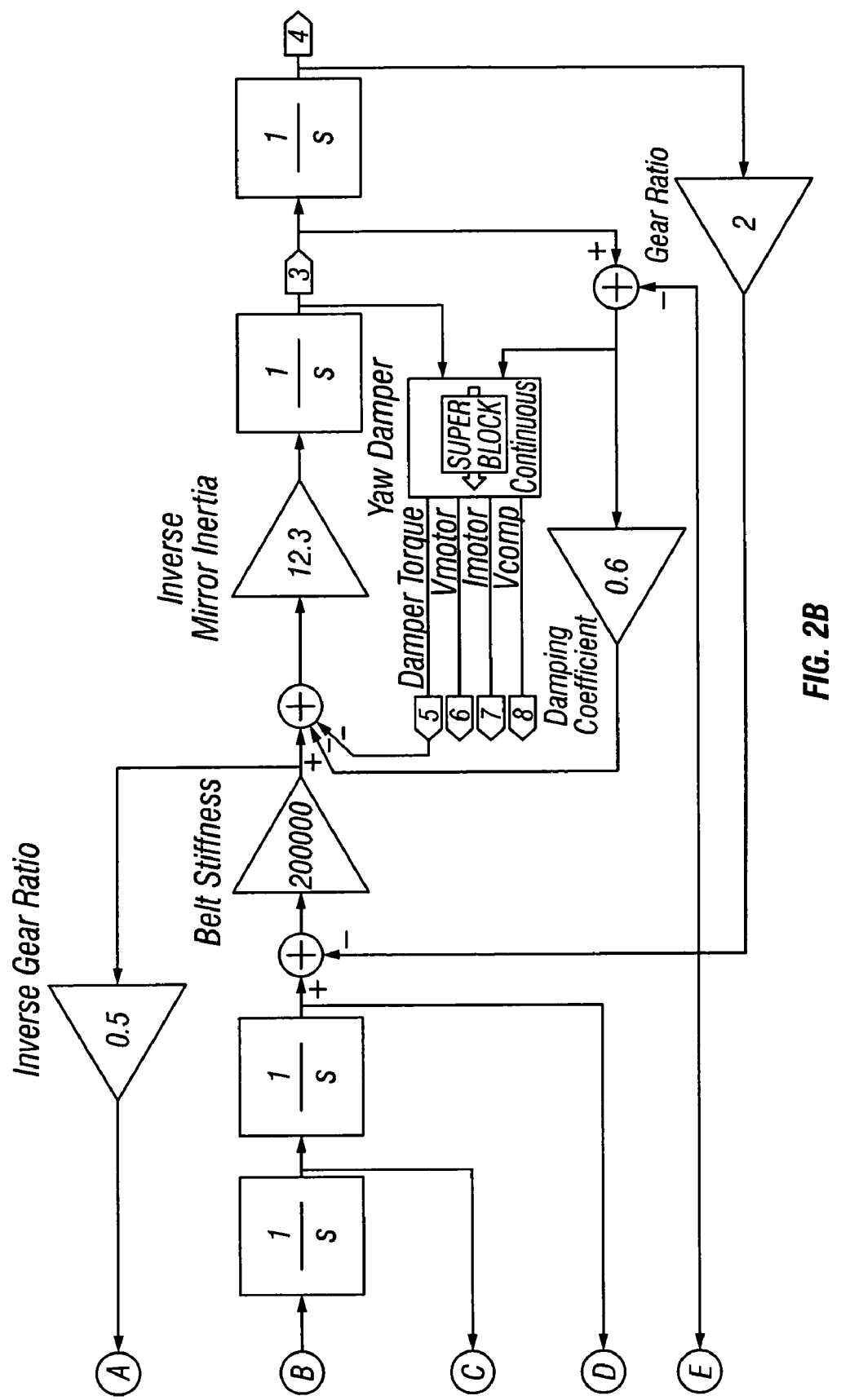
Figure 3:
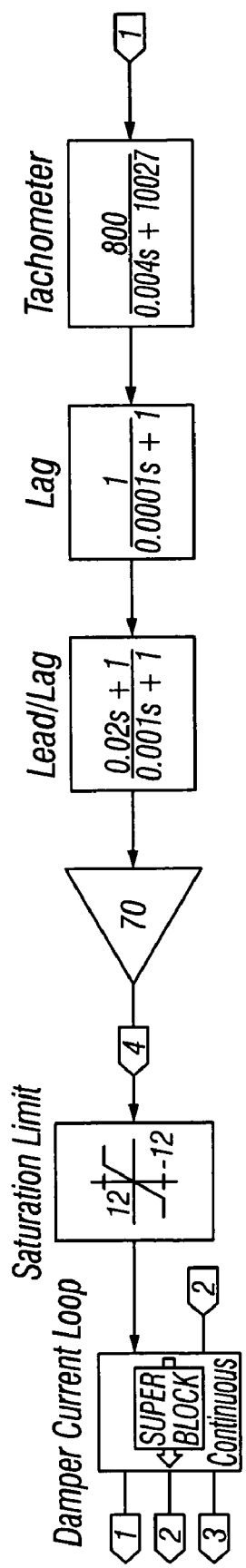
FIG. 3 is a functional block diagram of the active damper of FIG. 3 including the tachometer, compensation electronics, and motor and motor current amplifier.
Figure 4:
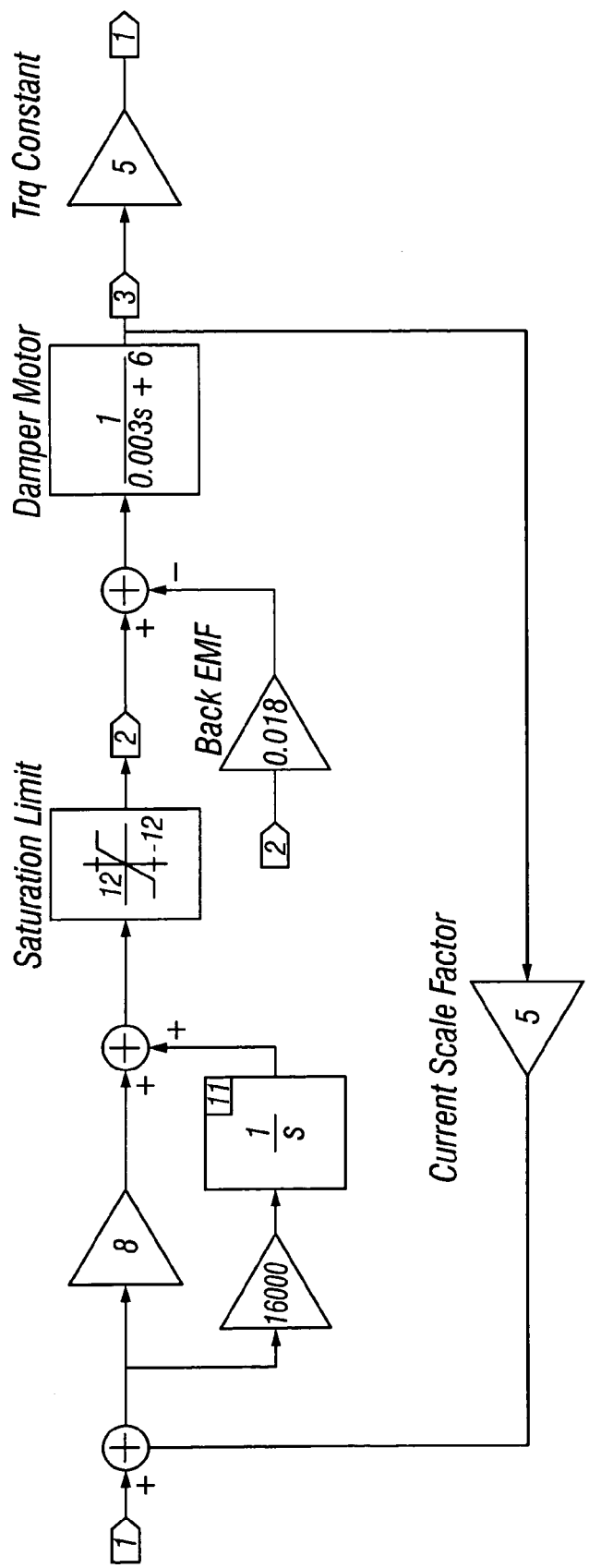
FIG. 4 is a functional block diagram of the current loop of FIG. 4 including current loop compensation and motor characteristics.

The active damper of the invention is an AC coupled rate loop (see FIGS. 1A and 1B) designed to provide damping to the belt mode only. It has no effect at frequencies less than half the belt mode frequency. The compensation actually provides nearly zero phase shift at the lower and upper crossover frequencies of the damper control loop. The primary purpose of the coupling is to provide AC coupling, thus eliminating any influence upon the gimbal at lower frequencies where LOS control is desirable for scanning and pointing.

FIG. 5 shows in detail the preferred electronics for the present invention. The design provides excellent performance, enabling an approximate 6 microradian stabilization and an approximate 70% damping of a belt mode at approximately 400 Hz. The design is simple, permitting an electronics card with a very small footprint and able to use conductors already in place on most gimbals.

FIGS. 1A, 1B, 2A, 2B, 3, and 4 show functional block diagrams of the electronics of the invention in conjunction with the a limited angle DC torque motor and a limited angle tachometer. FIGS. 1A, 1B, 2A, 2B, 3, and 4 are also useful in performing a Matrixx/Matlab simulation of the invention, permitting one of ordinary skill in the art to verify its utility and described and claimed.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An active damper for a stabilized mirror, said active damper comprising:
a tachometer measuring speed of a motor driving the mirror;
compensation electronics receiving input from said tachometer and the motor, said compensation electronics not computing or determining an acceleration of the motor; and
drive electronics providing output to the motor of the stabilized mirror and comprising an AC coupled rate loop; and
wherein said active damper does not affect operation of the mirror at frequencies at or below approximately one-half of a belt mode frequency.

2. The active damper of claim 1 wherein said electronics provide nearly zero phase shift at lower and upper crossover frequencies of a damper control loop.

3. The active damper of claim 1 wherein said active damper operates on said stabilized mirror in a gimbal.

4. The active damper of claim 1 wherein said active damper dampens a belt mode.

5. The active damper of claim 4 wherein said active damper dampens said belt mode at a frequency between approximately 240 Hz to 700 Hz.

6. The active damper of claim 5 wherein said active damper provides at least approximately 70% dampening of said drive belt mode.

7. The active damper of claim 4 wherein said active damper is substantially insensitive to belt frequency.

8. The active damper of claim 1 wherein said active damper is substantially insensitive to changes in temperature.

9. An active damping method for a stabilized mirror, the method comprising the steps of:
providing a tachometer measuring speed of a motor driving the mirror;
employing compensation electronics receiving input from said tachometer and the motor, the compensation electronics not computing or determining an acceleration of the motor; and
employing drive electronics providing output to the motor of the stabilized mirror and comprising an AC coupled rate loop; and
wherein the method does not affect operation of the mirror at frequencies at or below approximately one-half of a belt mode frequency.

10. The method of claim 9 wherein the electronics provide nearly zero phase shift at lower and upper crossover frequencies of a damper control loop.

11. The method of claim 9 wherein the method operates on the stabilized mirror in a gimbal.

12. The method of claim 9 wherein the method dampens a belt mode.

13. The method of claim 12 wherein the method dampens the belt mode at a frequency between approximately 240 Hz to 700 Hz.

14. The method of claim 13 wherein the method provides at least approximately 70% dampening of the drive belt mode.

15. The method of claim 12 wherein the method is substantially insensitive to belt frequency.

16. The method of claim 9 wherein the method is substantially insensitive to changes in temperature.

17. An active damper for a stabilized mirror, said active damper comprising:
a tachometer measuring speed of a motor driving the mirror;
compensation electronics receiving input from said tachometer and the motor, said compensation electronics not computing or determining an acceleration of the motor; and drive electronics providing output to the motor of the stabilized mirror and comprising an AC coupled rate loop; and wherein said active damper dampens a belt mode at a frequency between approximately 240 Hz to 700 Hz.

18. The active damper of claim 17 wherein said active damper provides at least approximately 70% dampening of said drive belt mode.

19. An active damping method for a stabilized mirror, the method comprising the steps of:

providing a tachometer measuring speed of a motor driving the mirror;

employing compensation electronics receiving input from said tachometer and the motor, the compensation electronics not computing or determining an acceleration of the motor; and employing drive electronics providing output to the motor of the stabilized mirror and comprising an AC coupled rate loop; and wherein the method dampens a belt mode at a frequency between approximately 240 Hz to 700 Hz.

20. The method of claim 19 wherein the method provides at least approximately 70% dampening of the drive belt mode.

21. An active damper for a stabilized mirror, said active damper comprising:

a tachometer measuring speed of a motor driving the mirror;

compensation electronics receiving input from said tachometer and the motor, said compensation electronics not computing or determining an acceleration of the motor; and drive electronics providing output to the motor of the stabilized mirror; and wherein said active damper does not affect operation of the mirror at frequencies at or below approximately one-half of a belt mode frequency.

22. An active damping method for a stabilized mirror, the method comprising the steps of:

providing a tachometer measuring speed of a motor driving the mirror;

employing compensation electronics receiving input from said tachometer and the motor, the compensation electronics not computing or determining an acceleration of the motor; and employing drive electronics providing output to the motor of the stabilized mirror; and wherein the method does not affect operation of the mirror at frequencies at or below approximately one-half of a belt mode frequency.

* * * * *